United States Patent
Snively et al.

(10) Patent No.: US 8,108,454 B2
(45) Date of Patent: Jan. 31, 2012

(54) ADDRESS ASSIGNMENT IN FIBRE CHANNEL OVER ETHERNET ENVIRONMENTS

(75) Inventors: Robert Norman Snively, Morgan Hill, CA (US); Sandra Snively, legal representative, Morgan Hill, CA (US); Ezio Valdevit, Redwood City, CA (US); Suresh Vobbilisetty, San Jose, CA (US); John Hufferd, San Jose, CA (US); Glenn Charles Wenig, Pleasanton, CA (US); Boris Zemlyak, San Jose, CA (US); Anoop Ghanwani, Rocklin, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 314 days.

(21) Appl. No.: 12/337,471

(22) Filed: Dec. 17, 2008

(65) Prior Publication Data

US 2009/0292813 A1 Nov. 26, 2009

Related U.S. Application Data

(60) Provisional application No. 61/014,413, filed on Dec. 17, 2007.

(51) Int. Cl.
*G06F 15/16* (2006.01)
(52) U.S. Cl. ........ 709/200; 709/208; 709/228; 709/238; 709/230; 709/224; 370/401; 370/357; 370/474; 370/465; 370/539
(58) Field of Classification Search .................. 709/228, 709/242, 230, 224, 238, 217
See application file for complete search history.

(56) References Cited

U.S. PATENT DOCUMENTS

| | | | |
|---|---|---|---|
| 4,922,486 A | 5/1990 | Lidinsky et al. | |
| 5,090,011 A | 2/1992 | Fukuta et al. | |
| 5,115,433 A | 5/1992 | Baran et al. | |
| 5,251,205 A | 10/1993 | Callon et al. | |
| 5,274,631 A | 12/1993 | Bhardwaj | |
| 5,305,311 A | 4/1994 | Lyles | |
| 5,390,173 A | 2/1995 | Spinney et al. | |
| 5,805,805 A | 9/1998 | Civanlar et al. | |
| 5,894,481 A | 4/1999 | Book | |
| 5,905,873 A | 5/1999 | Hartmann et al. | |

(Continued)

FOREIGN PATENT DOCUMENTS

WO 9836537 A1 8/1998

OTHER PUBLICATIONS http://www.t11.org/ftp/t11/pub/fc/bb-5/07-608v2.pdf; FCoE: Ethernet Direct-Attached Fabrics.*

(Continued)

*Primary Examiner* — Jude Jean Gilles
(74) *Attorney, Agent, or Firm* — Wong, Cabello, Lutsch, Rutherford & Brucculeri, LLP

(57) ABSTRACT

A method of initializing a Fiber Channel over Ethernet (FCoE) link between a Fiber Channel over Ethernet node (ENode) and Fiber Channel Forwarders (FCFs) in a network by discovering the presence of FCFs available to the ENode and other FCFs, assigning second MAC addresses to the ENode corresponding to each available FCF, and converting from a management and initialization process using the first MAC address to normal Fiber Channel operation using the second MAC addresses. The implementations described herein may additionally distinguish management and initialization processes from normal Fiber Channel operation using separate Ethertypes.

29 Claims, 5 Drawing Sheets

U.S. PATENT DOCUMENTS

| | | | |
|---|---|---|---|
| 5,996,024 | A | 11/1999 | Blumenau |
| 6,000,020 | A | 12/1999 | Chin et al. |
| 6,021,454 | A | 2/2000 | Gibson |
| 6,085,238 | A | 7/2000 | Yuasa et al. |
| 6,147,969 | A | 11/2000 | Benmohamed et al. |
| 6,278,532 | B1 | 8/2001 | Heimendinger et al. |
| 6,400,730 | B1 | 6/2002 | Latif et al. |
| 6,594,234 | B1 | 7/2003 | Chard et al. |
| 6,657,962 | B1 | 12/2003 | Barri et al. |
| 6,690,668 | B1 | 2/2004 | Szczepanek et al. |
| 6,738,821 | B1 | 5/2004 | Wilson et al. |
| 6,742,090 | B2 | 5/2004 | Sanada et al. |
| 6,763,417 | B2 | 7/2004 | Paul et al. |
| 7,027,450 | B2 | 4/2006 | Collette et al. |
| 7,072,298 | B2 | 7/2006 | Paul et al. |
| 7,088,735 | B1 | 8/2006 | Reohr, Jr. et al. |
| 7,120,728 | B2 | 10/2006 | Krakirian et al. |
| 7,130,303 | B2 | 10/2006 | Hadzic |
| 7,133,416 | B1 | 11/2006 | Chamdani et al. |
| 7,145,914 | B2 | 12/2006 | Olarig et al. |
| 7,194,550 | B1 | 3/2007 | Chamdani et al. |
| 7,197,047 | B2 | 3/2007 | Latif et al. |
| 7,206,314 | B2 | 4/2007 | Liao et al. |
| 7,218,636 | B2 | 5/2007 | Paul et al. |
| 7,236,496 | B2 | 6/2007 | Chung et al. |
| 7,237,045 | B2 | 6/2007 | Beckmann et al. |
| 7,269,168 | B2 | 9/2007 | Roy et al. |
| 7,308,001 | B2 | 12/2007 | Collette et al. |
| 7,376,765 | B2 | 5/2008 | Rangan et al. |
| 7,433,351 | B1 | 10/2008 | Pelissier et al. |
| 7,453,810 | B2 | 11/2008 | Zoranovic et al. |
| 7,466,712 | B2 | 12/2008 | Makishima et al. |
| 7,583,681 | B2 | 9/2009 | Green |
| 7,616,637 | B1 | 11/2009 | Lee et al. |
| 2002/0083285 | A1 | 6/2002 | Sanada et al. |
| 2002/0165978 | A1* | 11/2002 | Chui ............................ 709/238 |
| 2003/0043742 | A1 | 3/2003 | De Maria et al. |
| 2003/0126297 | A1 | 7/2003 | Olarig et al. |
| 2003/0131105 | A1 | 7/2003 | Czeiger et al. |
| 2003/0202536 | A1 | 10/2003 | Foster et al. |
| 2004/0133570 | A1 | 7/2004 | Soltis |
| 2005/0249247 | A1 | 11/2005 | Shanley et al. |
| 2005/0286551 | A1 | 12/2005 | Berman |
| 2006/0005076 | A1 | 1/2006 | Brown et al. |
| 2006/0007951 | A1 | 1/2006 | Meier |
| 2006/0098572 | A1 | 5/2006 | Zhang et al. |
| 2006/0098589 | A1 | 5/2006 | Kreeger |
| 2006/0098681 | A1 | 5/2006 | Cafiero |
| 2006/0101140 | A1 | 5/2006 | Gai |
| 2006/0168155 | A1 | 7/2006 | Pascasio et al. |
| 2006/0203725 | A1 | 9/2006 | Paul et al. |
| 2006/0206579 | A1 | 9/2006 | Connor et al. |
| 2006/0251067 | A1 | 11/2006 | DeSanti |
| 2007/0201490 | A1 | 8/2007 | Mahamuni |
| 2007/0288653 | A1 | 12/2007 | Sargor et al. |
| 2009/0052461 | A1 | 2/2009 | Brown et al. |
| 2009/0268746 | A1 | 10/2009 | Ogasahara et al. |

OTHER PUBLICATIONS

CD/9000 Channel Director—Product Detail by CNT, at http://web.archive.org/web/20050204044510/www.cnt.com/products/switching/cf9000, 2 pages, © 2003-2005, printed Jul. 19, 2006.

Cisco MDS 9000 Family Networked Storage Solutions for Small and Medium-Sized Businesses—At-a-Glance, 2 page product brochure, ©1992-2005 Cisco Systems, Inc.

Cisco MDS 9000 Family of Multilayer Directors and Fabric Switches, at http://www/cisco.com/en/US/products/ps6446/prod_brochure0900aecd80355d56.html, 3 pages, © 1992-2005, printed Jul. 19, 2006.

CNT Introduces New Generation Storage Networking Infrastructure, at http://web.archive.org/web/20050206034944/www.cnt.com/cnt/news/pr/2004/07-19-00, 3 pages, © 2003-2005, printed Jul. 19, 2006.

DStar: CNT Remains FICON Leader with UltraNet Multi-Service Director, at http://www.taborcommunications.com/dsstar/04/1109/109456.html, 2 pages, printed Jul. 19, 2006.

European Search Report prepared by the European Patent Office for EP Application No. 10 15 4286, dated May 28, 2010, 6 pages.

FC/9000 Fibre Channel/FICON Director—Product Detail by CNT, at http://web.archive.org/web/20050205081213/www.cnt.com/products/switching/fc9000, 3 pages, © 2003-2005, printed Jul. 19, 2006.

Lapuh, Roger et al., Split Multi-Link Trunking (SMLT) draft-lapuh-network-smlt-08, Internet Engineering Task Force, IETF; StandardWorkingDraft, Internet Society (ISOC) 4, Rue Des Falaises CH-1205, Geneva, Switzerland, No. 8, Jul. 7, 2008, XP015059390, 15 pages.

MCData—Intrepid 10000 Director, product brochure, 2 pages, 2006 McData Corporation.

McData—Intrepid 6140 Director, product brochure, 2 pages, 2006 McData Corporation.

Mogul, J. et al., "IP MTU Discovery Options," RFC 1063, Jul. 1998, 11 pages.

Schroeder, Michael E. et al., "Autonet: a High-speed, Self-configuring Local Area Network Using Point-to-point Links," Digital Equipment Corporation, SRC Research Report 59, Apr. 21, 1990, 44 pages.

Dec. 4, 2007, Uri Elzur and Pat Thaler; Broadcom, "FCoE MAC Addressing," V 0.1, 10 pages.

Dec. 5, 2007, Roger Hathorn, Mike Krause, Uri Elzur, "Specifying FCoE MAC Addressing Requirements," 07-736v0, 5 pages.

Dec. 6, 2007, Joe Pelissier, "FCoE: Mapped Addresses in Review," T11/07-714v1, 66 pages.

Dec. 5, 2007, Joe Pelissier, "FCoE: Mapped Addresses in Review," T11/07-714v0, 65 pages.

Nov. 5, 2007, IBM, T11/07-608v1, FCoE: Ethernet Direct-Attached Fabrics (EDAF), 13 pages.

Oct. 10, 2007, IBM, T11/07-608v0, FCoE: Ethernet Direct-Attached Fabrics (EDAF), 11 pages.

Dec. 5, 2007, John L. Hufferd, Brocade Communications Systems, Inc., T11/07-591v3, "FCoE & Server Provided MAC Addresses—Single OS Systems and Virtualizing Systems," 40 pages.

Dec. 3, 2007, John L. Hufferd, Brocade Communications Systems, Inc., T11/07-591v2, "FCoE & Server Provided MAC Addresses—Single OS Systems and Virtualizing Systems," 40 pages.

Nov. 8, 2007, John L. Hufferd, Brocade Communications Systems, Inc., T11/07-591v1, "FCoE & Server Provided MAC Addresses—Single OS Systems and Virtualizing Systems," 40 pages.

Oct. 8, 2007, John L. Hufferd, Brocade Communications Systems, Inc., T11/07-591v0, "FCoE & Server Provided MAC Addresses—Single OS Systems and Virtualizing Systems," 40 pages.

Oct. 10, 2007, Claudio Desanti, Cisco, T11/07-574v0, "FCoE Connections," 15 pages.

Oct. 11, 2007, Claudio Desanti, Cisco, T11/07-573v1, "FCoE Mapped MAC Addresses," 5 pages.

Oct. 10, 2007, Claudio Desanti, Cisco, T11/07-573v0, "FCoE Mapped MAC Addresses," 5 pages.

Nov. 9, 2007, Desanti et al., T11/07-572v1, "FCoE Discovery," 41 pages.

Oct. 10, 2007, Desanti, T11/07-572v0, "FCoE Discovery," 28 pages.

Oct. 8, 2007, Parag Bhide and Bob Nixon, 07-557v0, Emulex, "FCoE: ENode MAC Address Considerations," 7 pages.

Nov. 9, 2007, Silvano Gai, T11/07-547v1, Nuova, "FCoE: Addressing," 28 pages.

Oct. 10, 2007, Silvano Gai, T11/07-547v0, Nuova, "FCoE: Addressing," 32 pages.

Sep. 18, 2007. Suresh Vobbilisetty et al., 07-358v0, Brocade Communications Systems, Inc., "Fibre Channel over Ethernet: Encapsulation and Addressing Proposal," 17 pages.

\* cited by examiner ions in a FIP Discovery phase.
ADDRESS ASSIGNMENT IN FIBRE CHANNEL OVER ETHERNET ENVIRONMENTS

CROSS-REFERENCE TO RELATED APPLICATIONS

The present application claims benefit of U.S. Provisional Patent Application No. 61/014,413, filed Dec. 17, 2007 and entitled "Address Assignment in Fibre Channel Over Ethernet Environments," which is specifically incorporated by reference for all that it discloses and teaches.

BACKGROUND

A storage area network (SAN) may be implemented as a high-speed, special purpose network that interconnects different kinds of data storage devices with associated data s on behalf of a large network of users. Typically, a storage area network includes high performance switches as part of the overall network of computing resources for an. The storage area network is usually clustered in close geographical proximity to other computing resources, such as computers, but may also extend to remote locations for and archival storage using wide area network carrier technologies. Fibre Channel networking is typically used in SANs although other communications technologies may also be employed, including Ethernet and IP-based storage networking standards (e.g., iSCSI, FCIP (Fibre Channel over IP), etc.).

As used herein, the term "Fibre Channel" refers to the Fibre Channel family of standards (developed by the American National Standards Institute (ANSI)) and other related and draft standards. In general, Fibre Channel defines a transmission medium based on a high speed communications interface for the transfer of large amounts of data via connections between varieties of hardware devices.

In a typical SAN, one or more Fibre Channel switches are used to communicatively connect one or more server devices with one or more data storage devices. Such switches generally support a high performance switching fabric and provide a number of communication ports for connecting to other switches, servers, storage devices, or other SAN devices. Other high performance fabrics may employ different fabric technologies, such as Infiniband.

Other networking technologies, such as Ethernet, may also be employed in communicating between computing and networking devices. However, these networking technologies do not work seamlessly with high performance networks, such as a Fibre Channel network.

SUMMARY

Implementations described and claimed herein address the foregoing problems by providing a method of initializing a FCoE link between a host or other device and Fibre Channel Forwarders (FCFs) in a network by discovering the presence of Fibre Channel Forwarders available to the host or other device, optionally assigning second MAC addresses to the host or other device corresponding to each available Fibre Channel Switch Port, and converting from a management and initialization process using the first MAC address to normal Fibre Channel operation using the second MAC addresses. The implementations described herein may additionally distinguish management and initialization processes from normal Fibre Channel operation using separate Ethertypes.

Other implementations are also described and recited herein.

BRIEF DESCRIPTIONS OF THE DRAWINGS

DETAILED DESCRIPTION

Two conflicting mechanisms are considered for managing the MAC addresses of devices coupled to a high performance network. One, referred to as Server Provided MAC Addresses (SPMA), uses the MAC address offered by the host or other device as the only address which can be used to access the host or other device. The second, referred to as Fabric Provided MAC Addresses (FPMA) forces each of the available Fibre Channel Switch ports to select a unique MAC address derived from an identifier unique to a host or other device. The granted MAC address may be derived to meet the requirements of the attached host and/or Fibre Channel Switch port. This MAC address is then assigned and communicated to the host or other device. The host or other device then uses its granted address for Fibre Channel communication in violation of the Ethernet standards, while retaining its initial MAC address for further initialization and control functions.

The two aforementioned methods are incompatible and non-negotiable, creating market confusion and inhibiting the adoption of either solution. The method herein disclosed overcomes this problem and allows a simple and smooth selection of appropriate MAC addresses without modifying any Fibre Channel or Ethernet standards.

Figure 1:
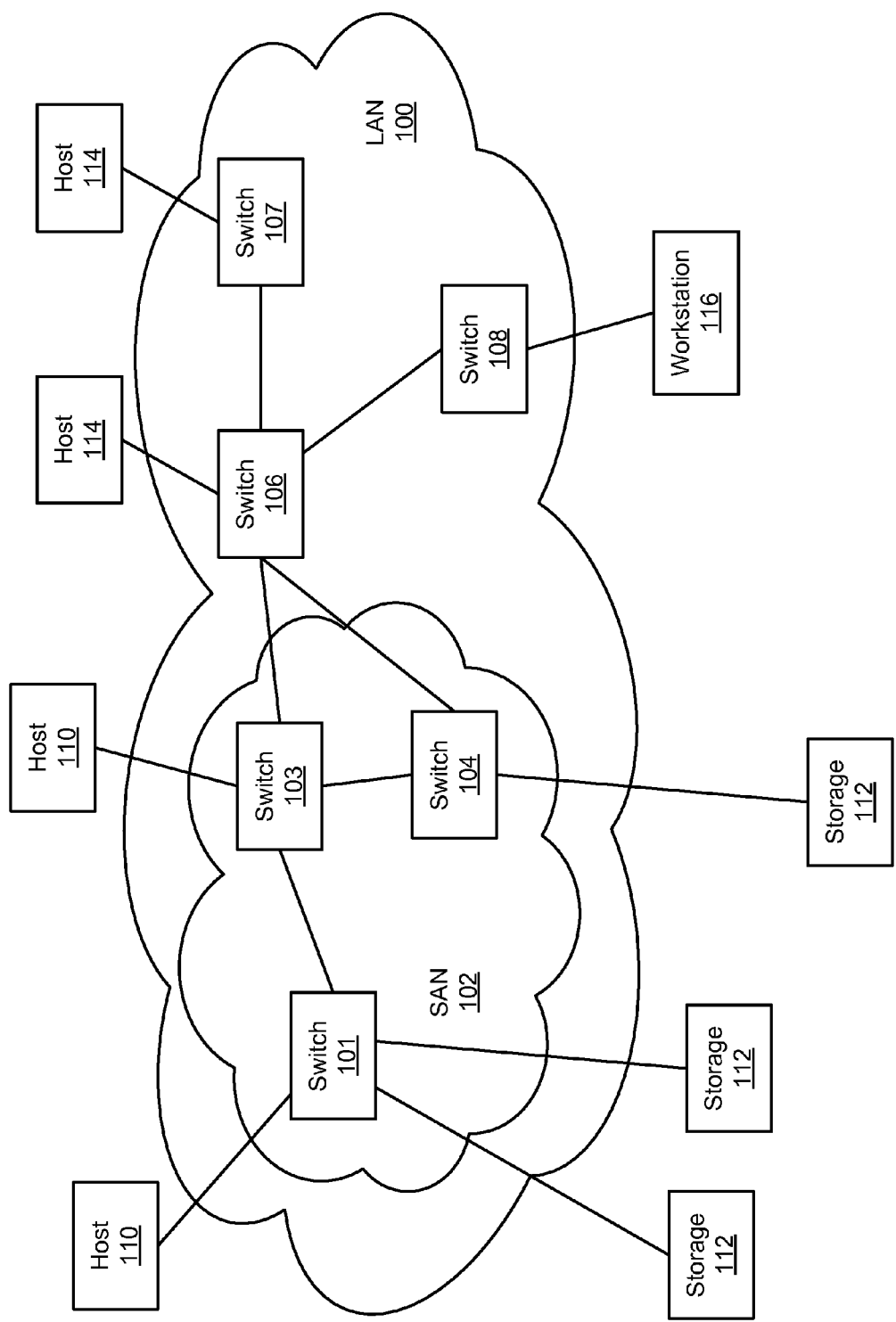
FIG. 1 illustrates an exemplary computing and storage framework including a local area network (LAN) and a storage area network (SAN).

FIG. 1 illustrates an exemplary computing and storage framework including a local area network (LAN) 100 and a storage area network (SAN) 102. A local area network (LAN) 100 provides communication connectivity among multiple devices, such as a workstation 116 and hosts 114. Connectivity within the LAN 100 is provided by switches 106, 107, and 108. The LAN 100 is presumed to be the network for a relevant enterprise with a number of different segments, although any LAN configuration may be employed.

A storage area network (SAN) 102 resides within the LAN 100 and provides communication connectivity, routing, and other SAN functionality among hosts 110 and storage units 112. The SAN 102 includes a number of switches, such as switches 101, 103, and 104. Such switches 103 and 104 may be configured as a set of blade components inserted into a chassis, as rackable or stackable modules, or as other device structures. In one implementation, the chassis has a back plane or mid-plane into which the various blade components, such as switching blades and control processor blades, may be inserted.

Two of the switches, i.e., switches 103 and 104, of the SAN 102 are connected within the LAN 102 via a switch 106. The switch 106 is also used to join other segments of the LAN 100, as represented by the other switches 107 and 108, which are also shown in the LAN 100. In addition, a series of hosts 110 are connected to various switches 104 in the SAN 102. Likewise storage units, such as described storage units 112, are connected also to various switches 104 in the SAN 102.

Generally, a developing standard called Fibre Channel over Ethernet (FCoE) allows Fibre Channel (FC) frames to be transmitted and received over an Ethernet network. In one implementation, a standard FC frame is equipped with a specified FCoE header and embedded within an Ethernet frame for communication through the Ethernet network. When an FCoE frame is transmitted through the Ethernet network and reaches a properly equipped FC switch at the boundary of a SAN, the FC switch strips off the Ethernet and FCoE portions of the frame and forwards the embedded FC frame through the SAN. Likewise, when a standard FC frame is transmitted through the SAN and reaches a properly equipped FC switch at the boundary of the SAN and an Ethernet network, the FC switch adds an FCoE header and an Ethernet header (with appropriate synchronization fields) to the FC frame and forwards the newly-enhanced FCoE frame to the Ethernet network.

The Ethernet header of the FCoE frame includes source and destination L2 (layer-2) addresses, such as MAC addresses, which the Ethernet network uses to direct the frame to its intended destination. For example, hosts and other devices on the Ethernet network can receive the FCoE frame if they are configured to receive frames having the MAC address in the destination field of the Ethernet header. Typically, each host or other device maintains a list of MAC addresses it is configured to receive. Such MAC addresses may be uni-cast addresses, multi-cast addresses, virtual addresses, etc.

In addition, each host or other device also has at least one MAC address that it inserts into the source L2 address field of any frame it transmits. The source address allows a receiving device to determine the sender of a frame and, therefore, destination address to which any reply should be sent. Many hardware host bus adapters, software applications, and operating systems choose to define the MAC address that is to be used as the preferred destination address for Ethernet frames directed to the host bus adapter and as the source address for Ethernet frames transmitted from the host bus adapter. Other host bus adapters, software applications, and operating systems choose to accept a MAC address provided by the SAN switch in order to encode information otherwise provided by the SAN switch. Such encoded information may include the Fibre Channel Destination Identifier (FC_ID) of frames transmitted by the SAN switch to that host adapter.

In one embodiment, a method of initializing an FCoE link between a host or other device (collectively an FCoE Node or ENode) and Fibre Channel Forwarders (FCFs) can be divided into three distinct phases: Discovery, MAC Address Assignment, and Fibre Channel Operation. The Discovery phase may include both solicitation and advertisement operations.

To avoid interference with highly optimized FCoE operational paths, frames transmitted in the Discovery and MAC Address Assignment phases of the FCoE Initialization Protocol may use an ethertype separate from the FCoE Etherype to perform the FCoE Initialization Protocol. In an implementation, frames transmitted in the Discovery and MAC Address Assignment phases may be transmitted in the FIP Ethertype.

Figure 2:
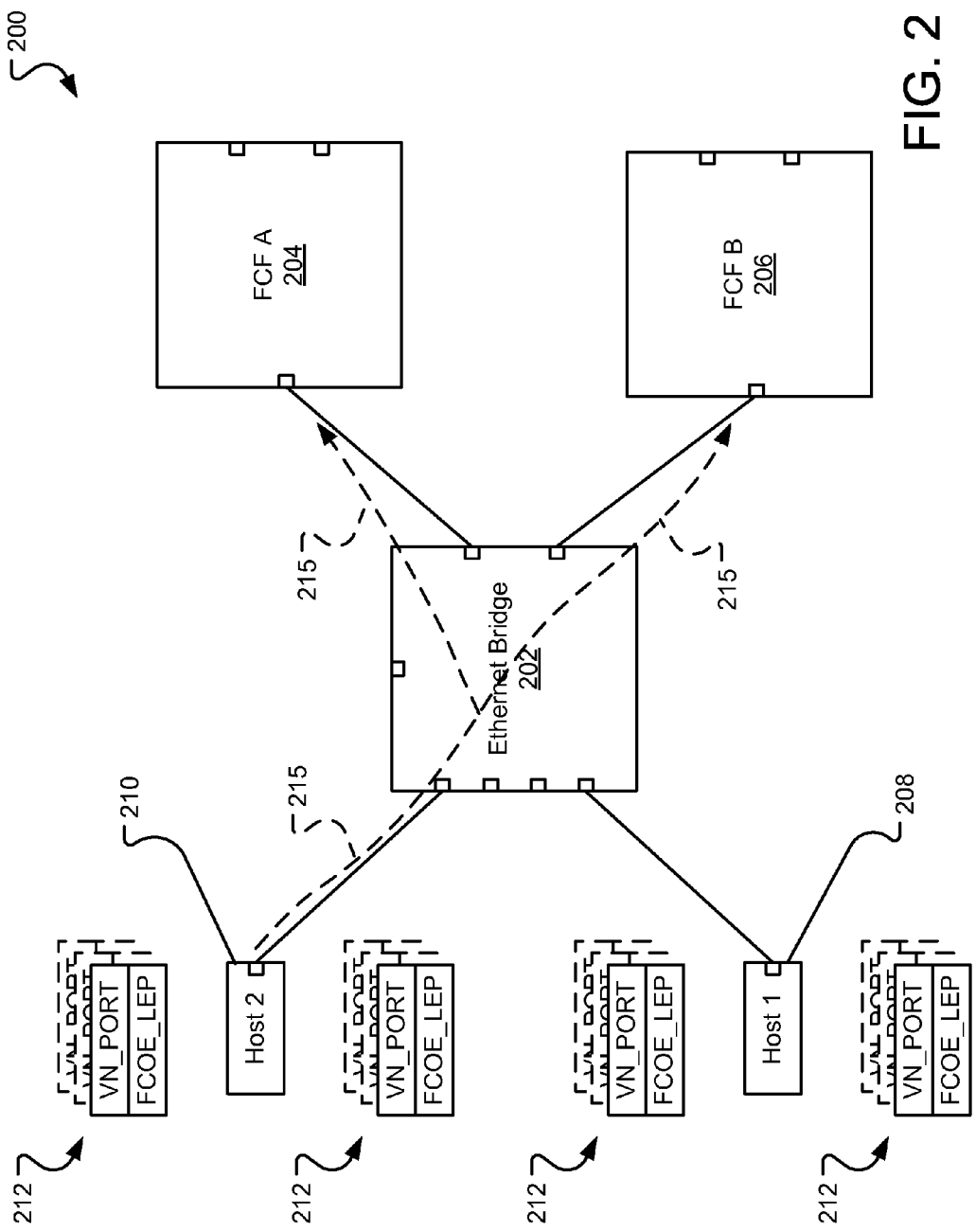
FIG. 2 illustrates an exemplary FCoE node (ENode) solicitation operation in a FCoE Initialization Protocol (FIP) Discovery phase.

FIG. 2 illustrates an exemplary FCoE node (ENode) solicitation operation in a FCoE Initialization Protocol (FIP) Discovery phase. In a communications network 200, an Ethernet Bridge 202 couples Fibre Channel Forwarders 204 and 206 (e.g, Fibre Channel switching elements with one or more Lossless Ethernet MACs (FCF-MACs), each coupled with an FCoE Controller) on the edge of a SAN with hosts 208 and 210. In one implementation, the Ethernet Bridge 202 is a Lossless Ethernet Bridge. In another implementation, the Ethernet Bridge 202 may include capabilities of congestion management and baby jumbo frame support. Congestion management may include one or more of the following: Pause, Per Priority Pause, and/or additional congestion management support protocol.

The FCFs 204 and 206 are coupled to other switching elements within the SAN, which is capable of providing networked connectivity with other hosts and data storage devices. In the illustrated implementation, each host or ENode supports Fibre Channel over Ethernet (FCoE) and is capable of maintaining one or more virtual links, such as a virtual N_PORT (VN_PORT) to virtual F_PORT (VF_PORT) link, as designated by the FCoE Link End Point (FCoE_LEP) icons and VN_PORT icons shown at 212. Each ENode has an ENode MAC address, which is the MAC address used by the ENode during FIP.

Each FCF has at least one Lossless Ethernet MAC (FCF-MAC) that is coupled with a FCoE controller function. Each FCF-MAC supports the instantiation of virtual E_PORTs (VE_PORTs) and/or VF_PORTS, and the FCF-MACs are referred to as VE_PORT capable FCF-MACs and VF_PORT capable FCF-MACs, respectively. As such, the hosts 208 and 210 are capable of accessing the storage devices of the SAN through the bridge 202 and one or more of the FCFs 204 and 206 using an FCoE protocol.

In one implementation, as an initial operation, the ENode MAC of the host 210 transmits via transmitter a multi-cast Discovery Solicitation frame to all VF_PORT capable FCF-MACs (shown in FIG. 2 as transmissions 215) to request that the VF_PORT capable FCF-MACs reply with a solicited Discovery Advertisement. However, it should be understood that the Discovery Solicitation frame may also be uni-cast (addressed to a specific FCF-MAC). The Discovery Solicitation frame includes a MAC address field in the MAC address descriptor, and the MAC address field indicates the MAC address to be used for subsequent solicited Discovery Advertisements from VF_PORT capable FCF-MACs. The Discovery Solicitation frame may also include additional information, such as a name identifier identifying the ENode, and/or a descriptor indicating the maximum FCoE payload size that the ENode MAC is able to receive.

Discovery Solicitation frames may be used by the ENode to identify a list of connected FCFs. Any Discovery Solicitations received by ENodes are discarded.

Figure 3:
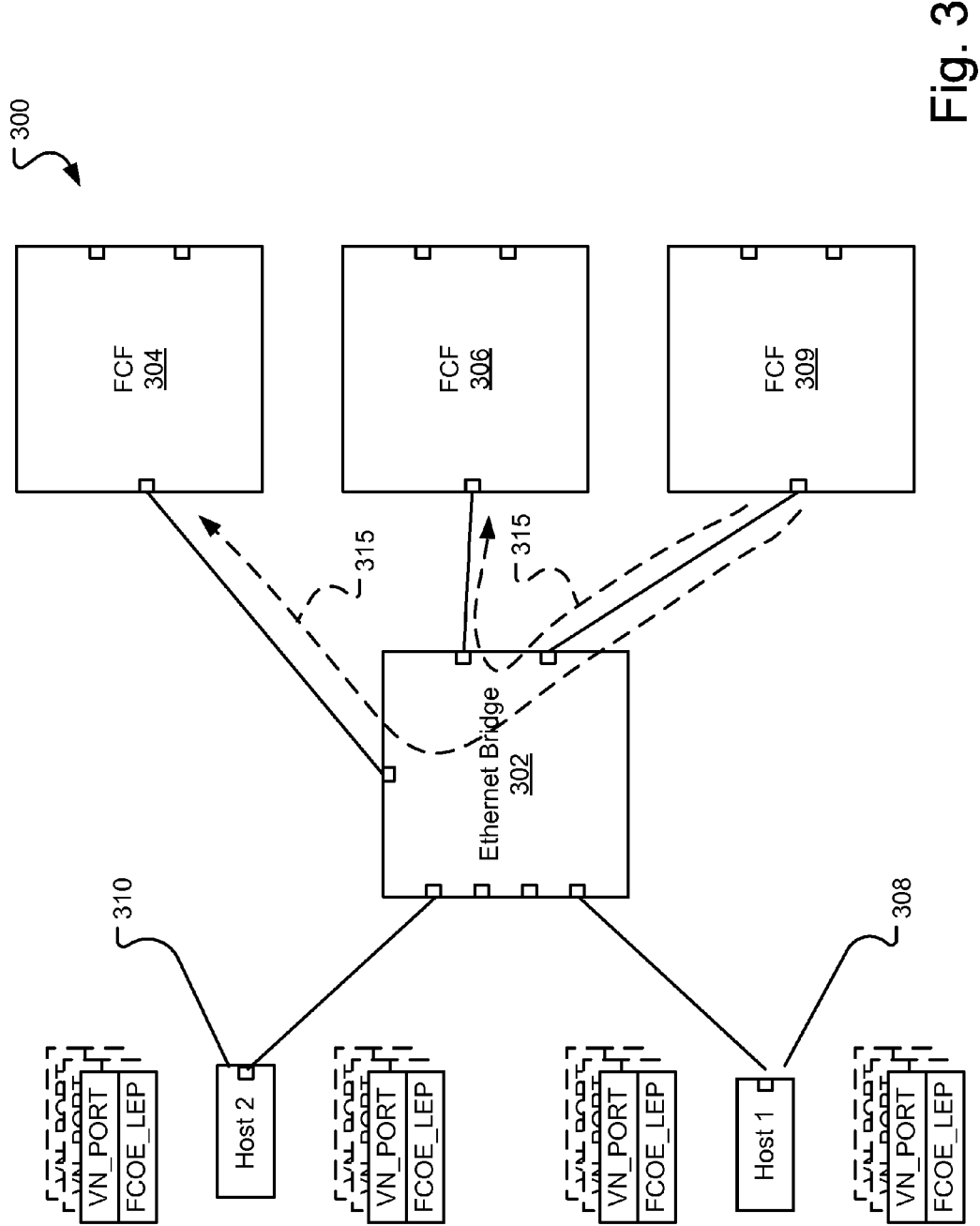
FIG. 3 illustrates an exemplary Fibre Channel Forwarder (FCF) solicitation operation in a FIP Discovery phase.

FIG. 3 illustrates an exemplary Fibre Channel Forwarder (FCF) solicitation operation in a FIP Discovery phase. In a communications network 300, an Ethernet Bridge 302 couples Fibre Channel Forwarders (FCFs) 304, 306, and 309 on the edge of a SAN with hosts 308 and 310. In one implementation, the Ethernet Bridge 302 may be a Lossless Ethernet Bridge. In another implementation, the Ethernet Bridge 302 may include capabilities of congestion management and baby jumbo frame support. Congestion management may include one or more of the following: Pause, Per Priority Pause, and/or additional congestion management protocol support.

The FCFs 304, 306, and 309 are coupled to other switching elements within the SAN, which is capable of providing networked connectivity with other hosts and data storage devices. In the illustrated implementation, each host or ENode supports Fibre Channel over Ethernet (FCoE) and is capable of maintaining one or more virtual links, such as a virtual N_PORT (VN_PORT) to virtual F_PORT (VF_PORT) link. Each ENode has an ENode MAC address, which is the MAC address used by the ENode during FIP.

Each FCF has at least one Lossless Ethernet MAC (FCF-MAC) that is coupled with a FCoE controller function. Each FCF-MAC supports the instantiation of virtual E_PORTs (VE_PORTs) and/or VF_PORTS, and the FCF-MACs are referred to as VE_PORT capable FCF-MACs and VF_PORT capable FCF-MACs, respectively. As such, the hosts 308 and 310 are capable of accessing the storage devices of the SAN through the bridge 302 and one or more of the FCFs 304, 306, and 309 using an FCoE protocol.

In one implementation, as an initial operation, a VE_PORT capable FCF-MAC, such as the FCF-MAC of FCF 309, may transmit via a transmitter a multi-cast Discovery Solicitation frame to all VE_PORT capable FCF-MACs (shown in FIG. 3 as transmissions 315) to request that the VE_PORT capable FCF-MACs reply with a solicited Discovery Advertisement. However, it should be understood that the Discovery Solicitation frame may also be uni-cast (addressed to a specific FCF-MAC). The Discovery Solicitation frame includes a MAC address field in the MAC address descriptor, and the MAC address field indicates the MAC address to be used for subsequent solicited Discovery Advertisements from VE_PORT capable FCF-MACs. The Discovery Solicitation frame may also include additional information, such as a name identifier identifying the Switch_Name of the FCF, and/or a descriptor indicating the maximum FCoE payload size that the FCF-MAC is able to receive.

In an implementation, for FCF-MACs that support FPMA, the FC-MAP field in the FC-MAP descriptor shall be set to the FC-MAP field in the FC-MAP descriptor shall be set to the FC-MAP value the FCF-MAC is using. If the FC-MAP value is not administratively configured, then the FC-MAP value shall be set to DEFAULT_FC-MAP. For FCF-MACs that only support SPMA, the FC-MAP field in the FC-MAP descriptor is reserved.

After receiving a valid Discovery Solicitation originated by an FCF (i.e., the F bit is set to one), an FCF may perform verification steps. For example, the FCF may compare the name identifier field value in the Discovery Solicitation to ensure that it is different than the Switch_Name of the recipient FCF. Further, the FCF may evaluate the FC-MAP field in the Discovery Solicitation to determine if the FC-MAP field value is zero or is the same as the FC-MAP value of the recipient FCF. If any verification steps fail, the FCF will discard the Discovery Solicitation.

Figure 4:
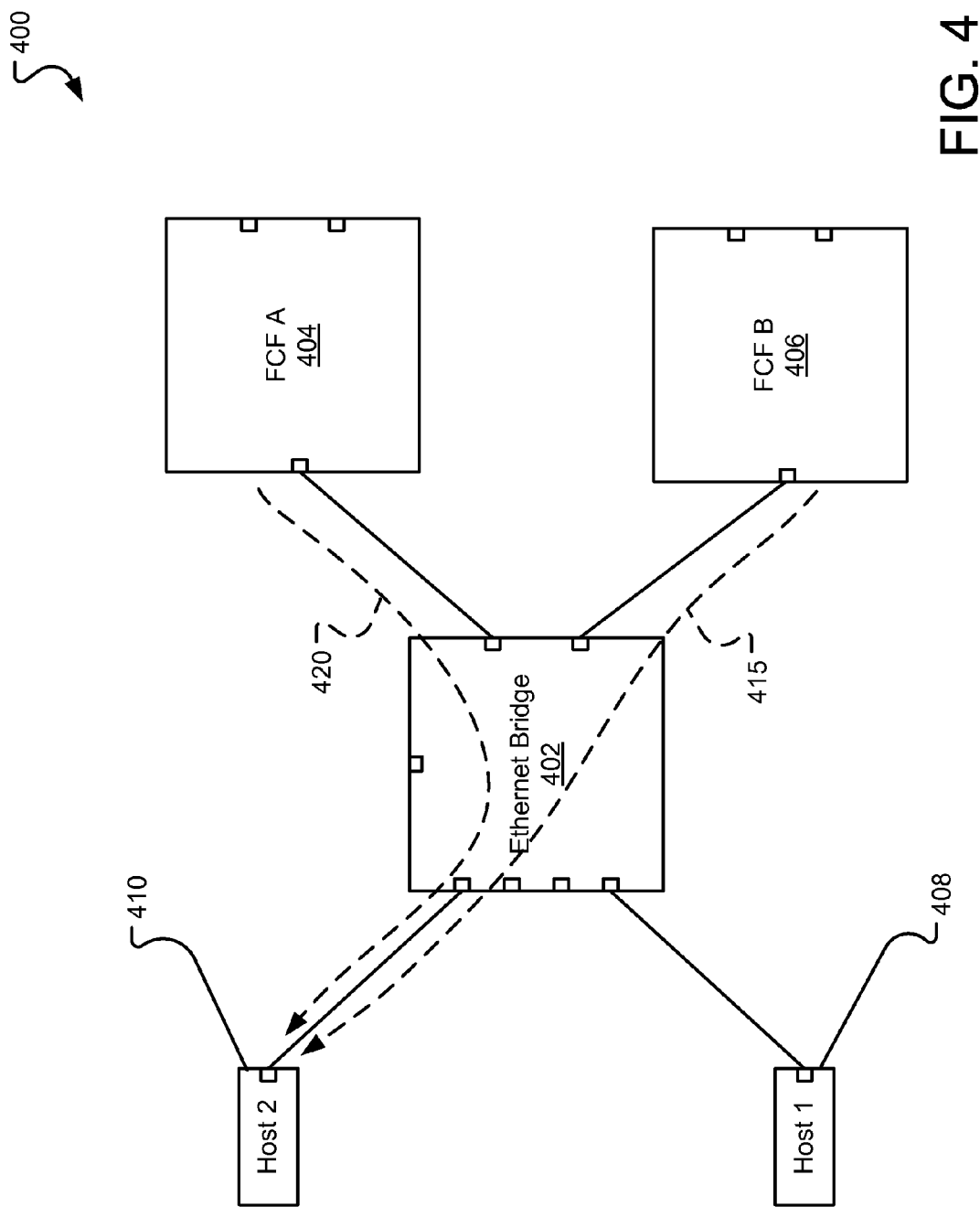
FIG. 4 illustrates an exemplary FCF solicited advertisement operation in a FIP Discovery phase.

FIG. 4 illustrates an exemplary FCF advertisement operation in a FIP Discovery phase. In a communications network 400, an Ethernet Bridge 402 couples Fibre Channel Forwarders 404 and 406 on the edge of a SAN with hosts 408 and 410. In one implementation, each of the FCFs 404 and 406 respond to a Discovery Solicitation from a host/ENode 410 with a solicited Discovery Advertisement (shown in FIG. 3 as transmissions 415 and 420) addressed to host/ENode 410. Each of Discovery Advertisements 415 and 420 includes an FCF-MAC address corresponding to the FCF-MAC transmitting the Discovery Advertisement in a MAC address field in a MAC address descriptor. A solicited Discovery Advertisement should be transmitted to a MAC address field value specified in a MAC address descriptor in the Discovery Solicitation received by the FCF. In some implementations, Discovery Advertisements transmitted in response to a multi-cast Discovery Solicitation may be delayed by random time intervals to reduce network congestion.

In the case where an FCF receives Discovery Solicitations from the same source on multiple FCF-MACs, a separate solicited Discovery Advertisement is transmitted in response to each Discovery Solicitation received.

While FIG. 4 illustrates the transmission of uni-cast Discovery Advertisements transmitted in response to received Discovery Solicitations, it should be understood that VF_PORT capable FCF-MACs and VE_PORT capable FCF-MACs may also transmit unsolicited Discovery Advertisements at random intervals. More specifically, VF_Port capable FCF-MACs may periodically transmit unsolicited Discovery Advertisements to all ENode MACs on the network, and VE_PORT capable FCF-MACs may periodically transmit unsolicited Discovery Advertisements to all FCF-MACs on the network.

Receipt of Discovery Advertisements, whether solicited or unsolicited, allows ENodes and FCF-MACs to compile and store a list of FCFs available and accessible via the network. For example, upon receipt of a Discovery Advertisement, an ENode FCoE Controller creates an entry per FCF-MAC in an internal FCF list. Each entry in the FCF list includes an indicator that the maximum FCoE size is verified, and an indicator of whether or not the FCF is able to accept additional login requests. FCoE Controllers for VE_PORT capable FCF-MACs create similar internal FCF lists including, for example, an indicator that the maximum FCoE Size is verified, and an indicator of whether or not the FCF is able to accept additional requests such as FIP exchange link parameter requests.

Figure 5:
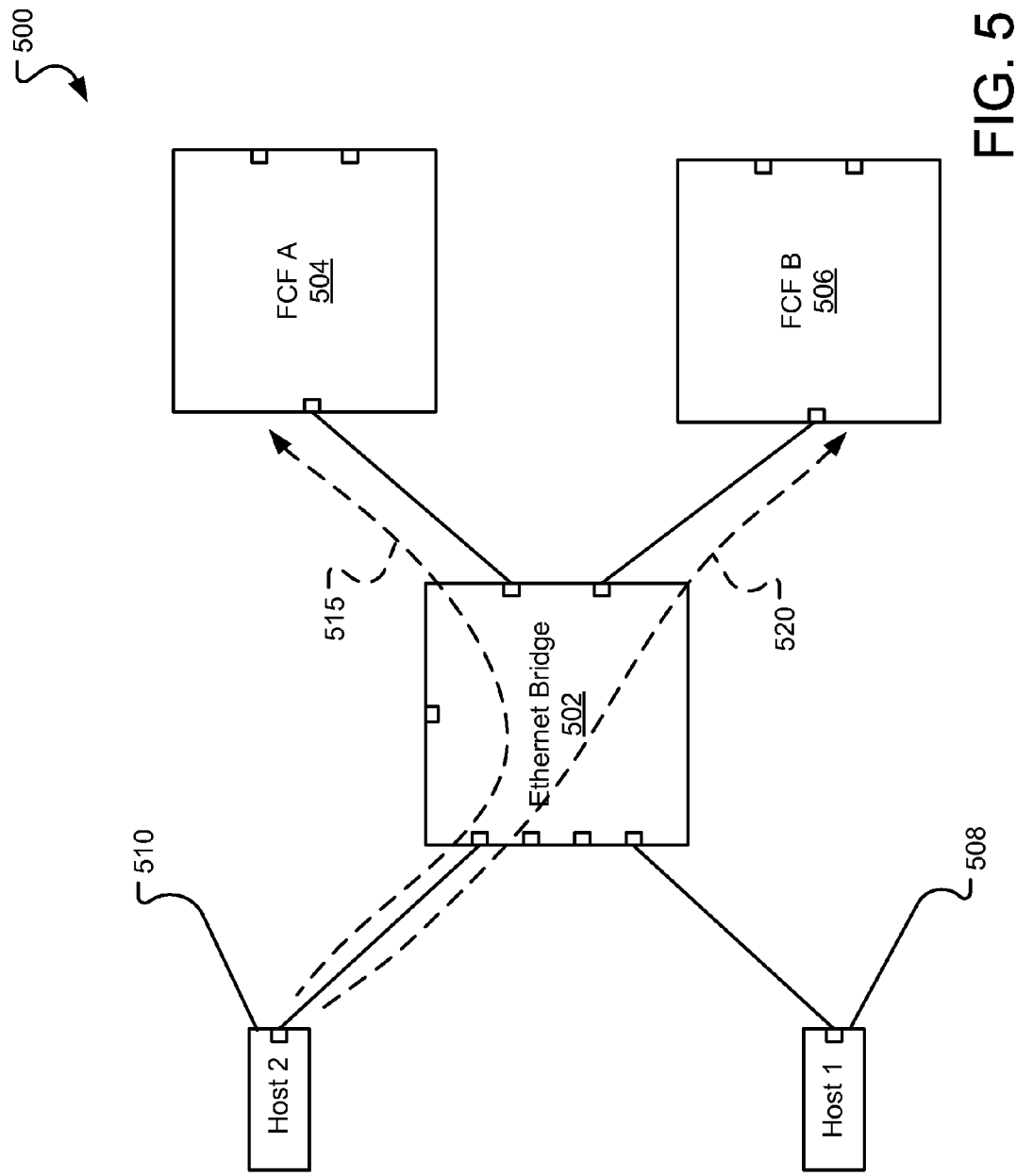
FIG. 5 illustrates an exemplary MAC Address Assignment operation in a FIP MAC Address Assignment phase.

FIG. 5 illustrates an exemplary MAC Address Assignment operation in a FIP MAC Address Assignment phase. In a communications network 500, an Ethernet Bridge 502 couples Fibre Channel Forwarders 504 and 506 (e.g, Fibre Channel switching elements with one or more Lossless Ethernet MACs (FCF-MACs), each coupled with an FCoE Controller) on the edge of a SAN with hosts 508 and 510. After Fibre Channel Forwarders 504 and 506 send Discovery Advertisements to the host/ENode 510, the host/ENode 510 sends uni-cast MAC Address Request transmissions 515 and 520 to FCFs 504 and 506, respectively. In response to the MAC Address Request transmissions, each of FCFS 504 and 506 responds with a uni-cast MAC Address Grant transmitted to the host/ENode 510. The MAC address to be used by the ENode may be included in the address grant frame, and may be the same MAC address used by the Discovery process, or may be a different MAC address, consistent with the requirement to avoid duplicated MAC addresses.

In an implementation, for example where SPMA is supported, the MAC address to be used by the ENode is included in the MAC Address Request, potentially with a bit indicating the provided SPMA MAC address, and the FCF grants the MAC address requested by the ENode, potentially with a bit set to indicate the acceptance of the SPMA MAC address request. In another implementation, for example where FPMA is supported, the FCF grants a MAC address to the ENode that is developed by the FCF for the convenience of the internal circuitry of the FCF, potentially with a bit indicating the provision of the FPMA MAC address. Where FPMA is supported, the MAC address granted to the ENode may be based on a Fibre Channel Destination Identifier (FC_ID) that will be assigned in a subsequent login.

After receiving the MAC Address Grant, ENode 510 may transmit a uni-cast confirmation to the FCF that granted the MAC address. The uni-cast confirmation indicates that the MAC Address Grant has been received and accepted the granted MAC address for use in communications with that FCF. This confirmation, however, is optional and may not be transmitted.

If the FCF does not receive the uni-cast confirmation, it interprets this as an indication that the address assignment failed (e.g., the ENode did not accept the granted MAC address). If the ENode actually transmitted the uni-cast confirmation but the Fibre Channel Switch did not receive it, then the discrepancy may be reconciled during a subsequent login operation.

After the ENode 510 is granted a MAC address, which may or may not be the same as the original MAC address, the new MAC address of the ENode may be used to perform fabric login (FLOGI) and all subsequent Fibre Channel operations in the normal manner according to Fibre Channel standards. More specifically, using the new MAC address, the ENode may transmit a FCoE Fabric Login Request to the FCF that granted the new MAC address. In response to the FLOGI Request, the FCF may transmit a FCoE Fabric Login Response to the ENode, granting the ENode an FC_ID for use with the newly granted MAC address. Once the ENode obtains an FC_ID, normal Fibre Channel operations can proceed in accordance with Fibre Channel standards.

In another implementation, the assignment of a MAC address to the ENode and the FCoE Fabric Login process may occur in a single-frame sequence, called an FIP Fabric Login (FLOGI) Request. The FIP FLOGI Request can reduce the number of frames transmitted between the ENode and the FCF and streamlined the login and FC_ID assignment process. In an alternative implementation, the ENode may request a MAC address by including a proposed MAC address in the FCoE Fabric Login request transmitted to the FCF. This eliminates the need for the ENode to transmit separate MAC Address Requests and FCoE Fabric Login Requests to the FCF. Further, a new MAC address is granted to ENode in the same frame as the FCoE Fabric Login Response, which includes the FC_ID granted to the ENode by the FCF. Thus, fewer transmissions between the ENode and the FCF are required to allow normal Fibre Channel operations in accordance with Fibre Channel standards.

In an implementation, the FIP FLOGI Request transmitted by the ENode includes an indication of the addressing mode(s) (i.e., FPMA, SPMA, or both) supported by that ENode. If an ENode only supports SPMA or supports both SPMA and FPMA, the ENode sets the MAC address field in the MAC address descriptor to the MAC address proposed in the FIP FLOGI Request for subsequent FCoE frames. If an ENode supports only FPMA, the ENode sets the MAC address field in the MAC address descriptor to the MAC Address proposed in the FIP FLOGI Request for subsequent FCoE frames, or to all zeroes to indicate that no MAC address is proposed.

In an implementation, if an ENode only supports SPMA, the MAC address specified in the FIP FLOGI Request is returned in the FLOGI Response and is used as the VN_PORT MAC address for all subsequent FCoE frames. If an ENode supports only FPMA, the MAC address specified in the FIP FLOGI Response frame shall be used as the VN_Port MAC address for all subsequent FCoE frames, and the MAC address assigned will be a properly formed FPMA MAC address. In this case, the assigned MAC address should be the MAC address proposed in the FIP FLOGI Request, if the proposed MAC address is a properly formed FPMA MAC address. A properly formed FPMA MAC address is one in which the 24 most significant bits equal the Fabric's FC-MAP value and the least significant 24 bits equal the N_Port_ID assigned to the VN_PORT by the FCF, thus guaranteeing that the FPMAs are unique within the Fabric.

In the case that an ENode supports both FPMA and SPMA, the assigned MAC address may be either the MAC address specified in the FIP FLOGI Request or a properly formed FPMA MAC address assigned by the FCF. In the case where both the FCF and the ENode support both SPMA and FPMA, the address assigned by the FCF may be of ether form.

In an implementation FIP FLOGI Requests from ENodes are rejected by FCFs if the ENode support only SPMA and propose a MAC address that is not a uni-cast address. FIP FLOGI Requests are also rejected if the addressing mode (i.e., SPMA or FPMA) is not supported by the FCF.

In the case where the FCF supports both FPMA and SPMA and the ENode supports only SPMA, the FCF can reject FIP FLOGI requests that contain a proposed MAC address in which the 24 most significant bits match the FC-MAP in use by the FCF.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
    transmitting from an Ethernet node (ENode) to a Fibre Channel Forwarding (FCF) node a uni-cast request for an L2 address assignment, the request including a source L2 address already attributed to the ENode as the requested L2 address; and
    receiving from the FCF node an assignment response specifying a granted L2 address, the granted L2 address being either the source L2 address already attributed to the ENode or a new L2 address assigned by the FCF node.

2. The method according to claim 1, further comprising associating a Fibre Channel FC_ID and the granted L2 Address with a subsequent FCoE Fabric Login operation.

3. A method of assigning an L2 address to a Fibre Channel over Ethernet node (ENode) in a Fibre Channel over Ethernet (FCoE) network, the method comprising:
    receiving at a Fibre Channel Forwarding (FCF) node a uni-cast request for an L2 address assignment, the request including a source L2 address already attributed to an Ethernet node (ENode) as the requested L2 address; and
    transmitting from the FCF node to the ENode an assignment response specifying a granted L2 address.

4. The method according to claim 3, wherein the granted L2 address is the source L2 address already attributed to the ENode.

5. The method of claim 3, wherein the granted L2 address is a new L2 address assigned by the FCF node.

6. The method of claim 5, further comprising receiving at the FCF node a unicast confirmation from the ENode.

7. The method of claim 4, further comprising receiving at the FCF node a unicast confirmation from the ENode.

8. The method of claim 4, further comprising performing a fabric login using the granted L2 address.

9. The method of claim 3, wherein the received request includes a bit indicating an L2 address already attributed to the ENode.

10. The method of claim 4, wherein the transmitted assignment response includes a bit indicating the use of the L2 address already attributed to the ENode.

11. The method of claim 5, wherein the transmitted assignment response includes a bit indicating the use of a new L2 address assigned by the FCF node.

12. The method of claim 1, further comprising transmitting a uni-cast confirmation from the ENode to the FCF.

13. The method of claim 1, further comprising performing a fabric login using the granted L2 address.

14. The method of claim 1, wherein the transmitted request includes a bit indicating an L2 address already attributed to the ENode.

15. The method of claim 1, wherein the received assignment response includes a bit indicating the use of the L2 address already attributed to the ENode or the use of a new L2 address assigned by the FCF node.

16. An Ethernet node (ENode) device comprising:
a transmission module which operates to transmit a uni-cast request for an L2 address assignment to a Fibre Channel Forwarding (FCF) node, the request including a source L2 address already attributed to the ENode device as the requested L2 address; and
a reception module coupled to the transmission module and which operates to receive from the FCF node an assignment response specifying a granted L2 address and which causes the ENode device to utilize the granted L2 address.

17. The ENode device of claim 16, wherein the granted L2 address is the source L2 address already attributed to the ENode device.

18. The ENode device of claim 16, wherein the granted L2 address is a new L2 address assigned by the FCF node.

19. The ENode device of claim 16, wherein the transmission module further operates to transmit a uni-cast confirmation to the FCF node subsequent to receiving the assignment response.

20. The ENode device of claim 16, wherein the transmission module is further operable to transmit an FCoE fabric login request including the granted L2 Address.

21. The ENode device of claim 16, wherein the transmitted request includes a bit indicating an L2 address already attributed to the ENode.

22. The ENode device of claim 16, wherein the received assignment response includes a bit indicating the use of the L2 address already attributed to the ENode or the use of a new L2 address assigned by the FCF node.

23. A Fibre Channel Forwarding (FCF) node device comprising:
a reception module which operates to receive from an Ethernet node (ENode) device a uni-cast request for an L2 address assignment, the request including a source L2 address already attributed to the ENode device as the requested L2 address; and
a transmission module coupled to the reception module to receive the source L2 address already attributed to the ENode device and which operates to transmit an assignment response specifying a granted L2 address.

24. The FCF node device of claim 23, wherein the granted L2 address is the source L2 address already attributed to the ENode device.

25. The FCF node device of claim 23, wherein the granted L2 address is a new L2 address assigned by the FCF node device.

26. The FCF node device of claim 23, wherein the reception module further operates to receive a uni-cast confirmation from the ENode device subsequent to transmitting the assignment response.

27. The FCF node device of claim 23, wherein the reception module further operates to receive an FCoE fabric login request including the granted L2 Address from the ENode device.

28. The FCF node device of claim 23, wherein the received request includes a bit indicating an L2 address already attributed to the ENode.

29. The FCF node device of claim 23, wherein the transmitted assignment response includes a bit indicating the use of the L2 address already attributed to the ENode device or the use of a new L2 address assigned by the FCF node device.

* * * * *